United States Patent
Jones et al.

(10) Patent No.: US 7,663,602 B2
(45) Date of Patent: Feb. 16, 2010

(54) REMOVABLE WIRELESS KEYBOARD WITH BASE

(75) Inventors: Gregory G. Jones, Seattle, WA (US); Steven W. Fisher, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 10/823,600

(22) Filed: Apr. 14, 2004

(65) Prior Publication Data

US 2005/0231485 A1 Oct. 20, 2005

(51) Int. Cl.
*G06F 3/02* (2006.01)
(52) U.S. Cl. .................................. 345/168; 361/679.17
(58) Field of Classification Search ................ 345/163, 345/168; 341/22; 361/680, 679.17; D14/396; 206/320; 400/472
See application file for complete search history.

(56) References Cited

U.S. PATENT DOCUMENTS

| | | | | |
|---|---|---|---|---|
| 5,510,953 | A | * | 4/1996 | Merkel ........................ 361/680 |
| 6,056,458 | A | * | 5/2000 | Lin ............................. 400/477 |
| 6,104,604 | A | * | 8/2000 | Anderson et al. ........... 361/680 |
| 6,317,061 | B1 | * | 11/2001 | Batra et al. ................... 341/22 |
| 6,384,737 | B1 | | 5/2002 | Hsu et al. |
| 6,480,372 | B1 | | 11/2002 | Vong et al. |
| 6,493,215 | B1 | * | 12/2002 | Chiang et al. ............... 361/680 |
| 6,529,145 | B1 | * | 3/2003 | Lin ............................. 341/22 |
| 6,549,143 | B1 | | 4/2003 | O'Donnell et al. |
| 6,982,702 | B1 | * | 1/2006 | Frame ........................ 345/168 |
| 6,986,614 | B2 | * | 1/2006 | McLoone .................... 400/472 |
| 2003/0021082 | A1 | * | 1/2003 | Lu et al. ..................... 361/683 |
| 2003/0048256 | A1 | * | 3/2003 | Salmon ...................... 345/168 |
| 2003/0174123 | A1 | * | 9/2003 | Cheng ........................ 345/163 |

FOREIGN PATENT DOCUMENTS

JP 2002-374346 * 12/2002

OTHER PUBLICATIONS www.logitech.com, Logitech® diNovo™ Media Desktop™ Product description, 2004, date of product release unknown, 3 pages.
www.logitech.com, Logitech® Premium Desktop Optical Product description, 2004, data of product release unknown, 2 pages.

* cited by examiner

*Primary Examiner*—Chanh Nguyen
*Assistant Examiner*—Pegeman Karimi
(74) *Attorney, Agent, or Firm*—Birch, Stewart, Kolasch & Birch, LLP (57) ABSTRACT

Keyboard input functionality is provided when a removable portion of the keyboard is docked into the base unit. The removable portion may be the undocked from the base unit. A keyboard removable portion may include alphanumeric functionality and may be of a reduced size for off-desk implementation. Since the base of the keyboard may be wired, it may also charge the removable portion of the keyboard. The base may also include the wireless receiver for cooperating with a wireless keyboard or wireless mouse.

18 Claims, 9 Drawing Sheets

REMOVABLE WIRELESS KEYBOARD WITH BASE

FIELD OF THE INVENTION

The present invention relates to a computer keyboard. More particularly, the present invention relates to a keyboard that includes a removable portion for controlling a graphical user interface and/or alphanumeric user input.

BACKGROUND OF THE INVENTION

Conventional computer systems, especially computer systems using graphical user interface (GUI) systems, accept user input from a conventional input device, such as a keyboard for entering text, and a pointing device, such as a mouse for operating the graphical user interface.

A traditional notion of user interaction is generally in front of a desktop computer or at least sitting within close viewing proximity to a display screen as with laptop computers. Conventional systems are problematic in meeting the challenge of user interaction for new media. The evolution of new media models of computing, such as digital television, digital music, digital movies, have changed the traditional view of the GUI, and the manner in which users can interact with their computers. In one example of a home theater environment, users may be sitting at couch at a distance away from a display screen. At one time, the users may want to manipulate a GUI to obtain and watch live TV or recorded TV, digital home movies and picture slideshows, or watch DVDs movies. In another example, users may want to work on their keyboard in other locations than the traditional desktop such in a lap-use environment. In this "lap-use" or "couch-use" environment, a traditional notion of desktop user interaction can be inefficient and frustrating for many individuals. Thus, the users do not realize the full benefits of experiencing new media computing and productivity software.

What is needed is an apparatus and method to support user interaction for an untethered environment with a keyboard for manipulating the GUI for the new media technologies and productivity activities, such as creation and modification of electronic documents, spreadsheets, database fields, drawings, photos and the like.

SUMMARY OF THE INVENTION

The present invention pertains to a computer keyboard includes a removable portion for controlling a graphical user interface and/or alphanumeric user input.

In one aspect, a computer keyboard system includes a first keyboard with a microprocessor configured for operating a number pad with a key cluster or a biometric reader device. A second keyboard may have an alphanumeric section being removable from the first keyboard. The second keyboard may be nested within a receiving portion of the first keyboard and removably coupleable to the first keyboard. When the first keyboard and second keyboard are coupled together, the first keyboard includes a microprocessor operable to electrically charge a mobile power source in the second keyboard.

In another aspect, keyboard input functionality is provided when a removable portion of the keyboard is docked into the base unit. The removable portion may be the undocked from the base unit. A keyboard removable portion may include alphanumeric functionality and may be of a reduced size for off-desk implementation. The base unit may also electrically charge the removable portion of the keyboard in a wired or wireless configuration. The base may also include the wireless receiver for cooperating with a wireless keyboard or wireless mouse.

In one aspect, a wireless keyboard base unit may have a wireless transmitter to communicate with a host computer. A wireless removable alphanumeric section may be nestable within the base unit. The removable section may have a wireless transmitter to the host computer and may be rechargeable when nested in the base unit.

In one aspect, a wired keyboard base unit may have multiple key configurations, such as a set of function keys, a number pad and/or a fingerprint reader. The base unit may be coupled to a host computer via wired signaling. The base unit may have a wireless receiver for a removable alphanumeric section. There may be coupling via wireless signaling if the removable section is nested with the base unit, or if the removable section is physically removed from the base unit. When in a nested arrangement, the removable section can be powered by the base unit for battery recharging power management.

Thus, aspects and features of the present invention enable users to enjoy experiences of rich digital media, such as gaming with a computer system or navigate the Internet, send and receive electronic mail messages or Instant Messaging, operate spreadsheets, create documents and presentations with ease of operation in a new media environment.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION

Illustrative Operating Environment

Keyboard input functionality is provided by way of a removable portion of a keyboard in wired or wireless communication with a keyboard base or host computer system. The removable portion of the keyboard can be used for "off-desk" tasks. A keyboard base can include a wireless receiver for the wireless removable portion or a wireless mouse. Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. A host computer system can be used for processing data new media technology environment. Such an illustrative host computer system is illustrated in FIG. 1.

Figure 1:
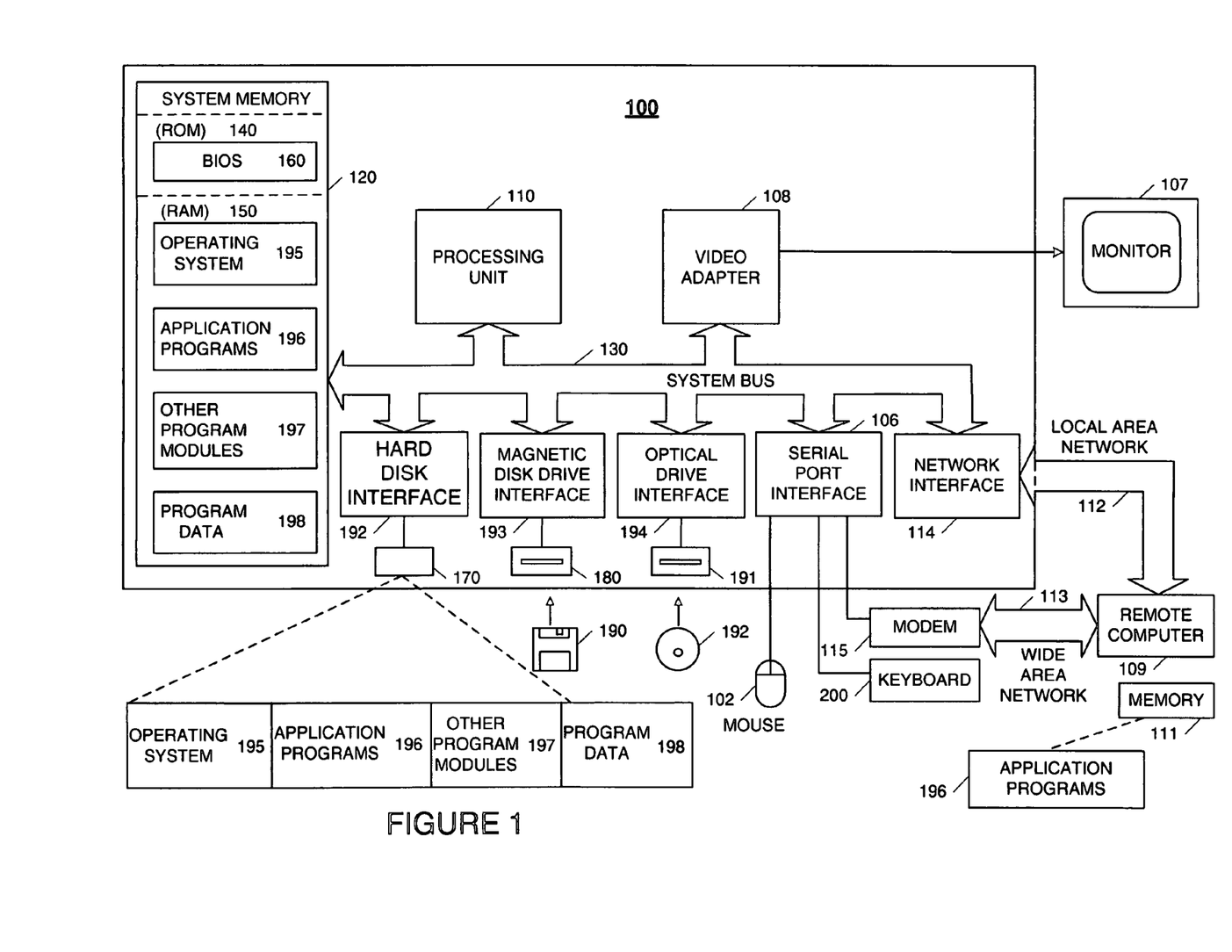
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 200 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Illustrative Keyboard Environments

Figure 2:
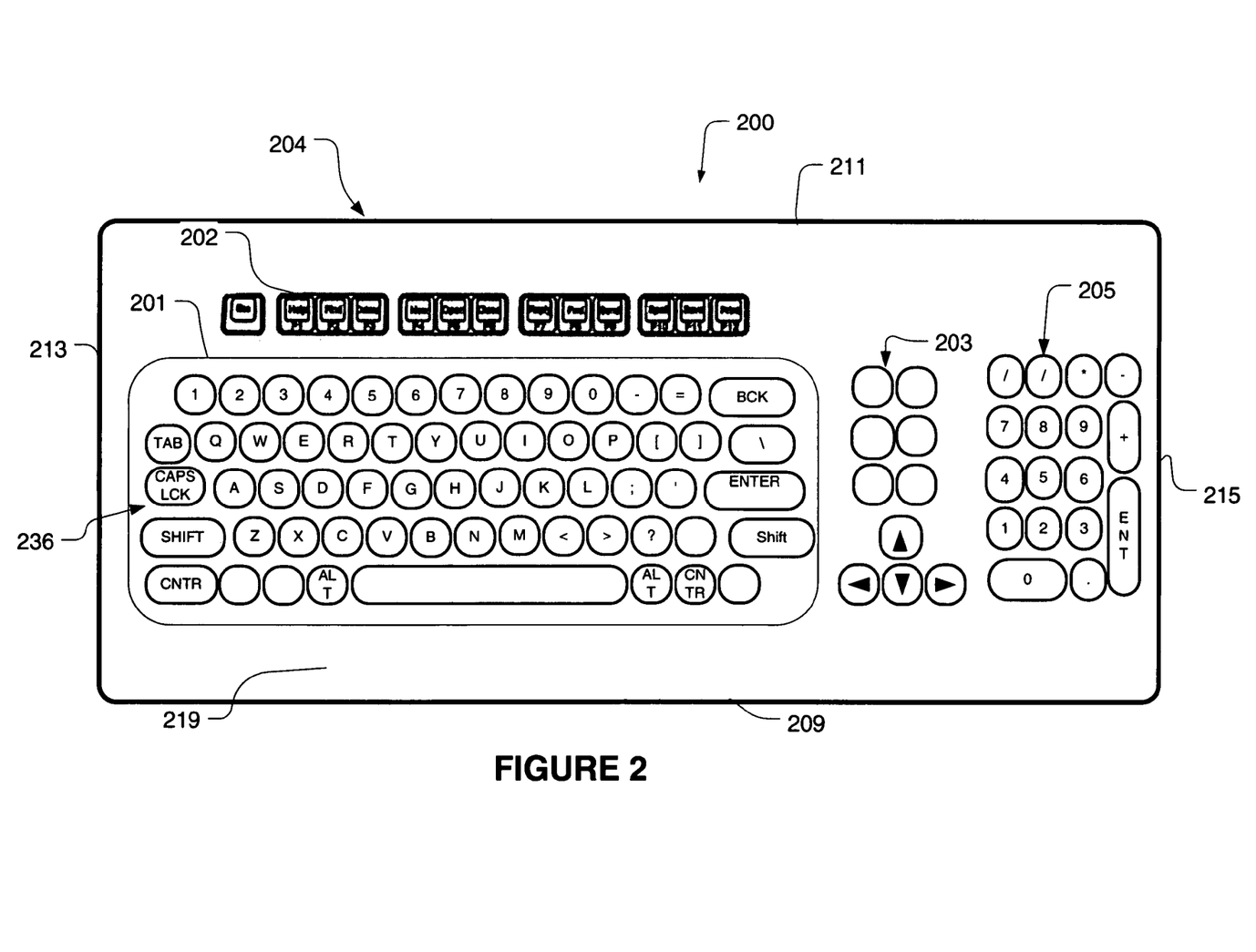
FIG. 2 is a schematic representation of a first keyboard arrangement according to one or more aspects of the present invention.

Keyboard system arrangements in accordance with one or more aspects of the present invention are shown in FIGS. 2-9. Referring to FIG. 2, keyboard system 200 includes an alphanumeric section 201, an editing section 203, and a numeric section 205. For reference purposes, the keyboard system 200 has a keyboard housing 219 which includes a front edge 209 adjacent to the user during normal use and a back edge 211 distal from the user during normal use. Accordingly, an object is said herein to be "behind" another object when it is between that object and the back edge 211. An object is said herein to be "directly behind" another object when it is between that object and the back edge 211 and at least partially located within the lateral bounds of that object extending in the front-to-back direction. An object is said herein to be "in front of" another object when it is between that object and the front edge 209. Further, the keyboard system 200 also a left edge 213 and a right edge 215. The direction "lateral" defines the general directions from the left edge 213 to the right edge 215 and from the right edge 215 to the left edge 213. A "key cluster" is defined as a group of keys, each of which is immediately adjacent, or in close proximity, to adjacent keys within the cluster and set apart from other keys on the keyboard by a distance larger than the spacing between the adjacent keys in the cluster.

The alphanumeric section 201, sometimes referred to as the QWERTY section, includes keys for each of the letters of the alphabet, each of the digits 0-9, and various punctuation symbols. It should be recognized that the keys within the alphanumeric section 201 may include indicia and/or characters related to the English language or other languages. A function key section 202 may be located behind the alphanumeric section 201. The editing section 203 may be located immediately to the right or left of the alphanumeric section 201. The section 203 may include four cursor control arrow keys, and Delete, Insert, Home, End, PageUp, and PageDown keys. Keys or buttons for the sections 201, 202 and 203 may be mechanically depressible or electronic activated, such as touch display surface with associatively linked sensitive keys. Nevertheless, the cursor control devices may be D-pad, trackball type device, touch pad, or a thumb pad area that reads thumb movement with the use of and optical engine and the like.

Figure 3:
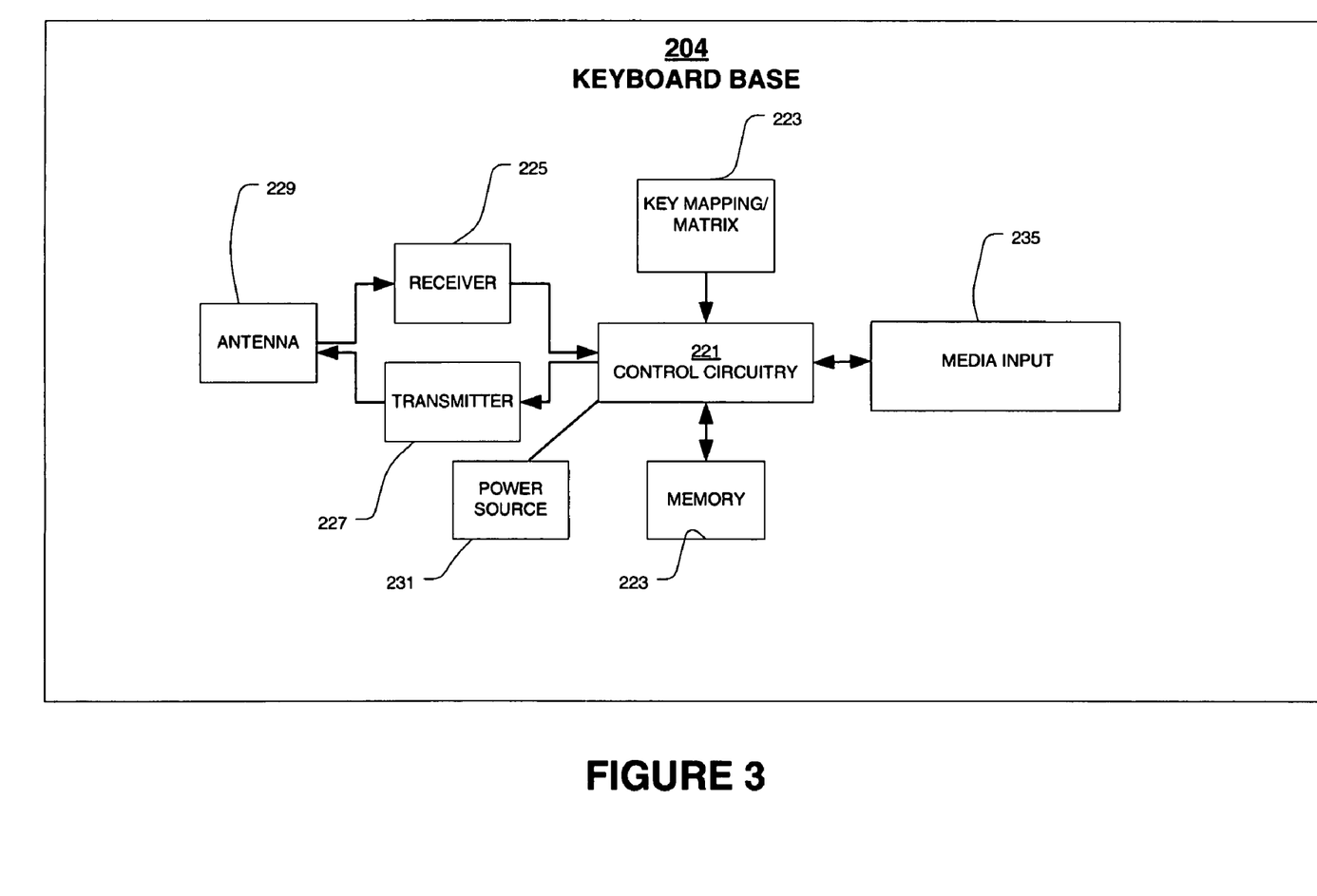
FIG. 3 is a finctional block diagram of a keyboard arrangement shown in FIG. 2 according to one or more aspects of the present invention.
Figure 6:
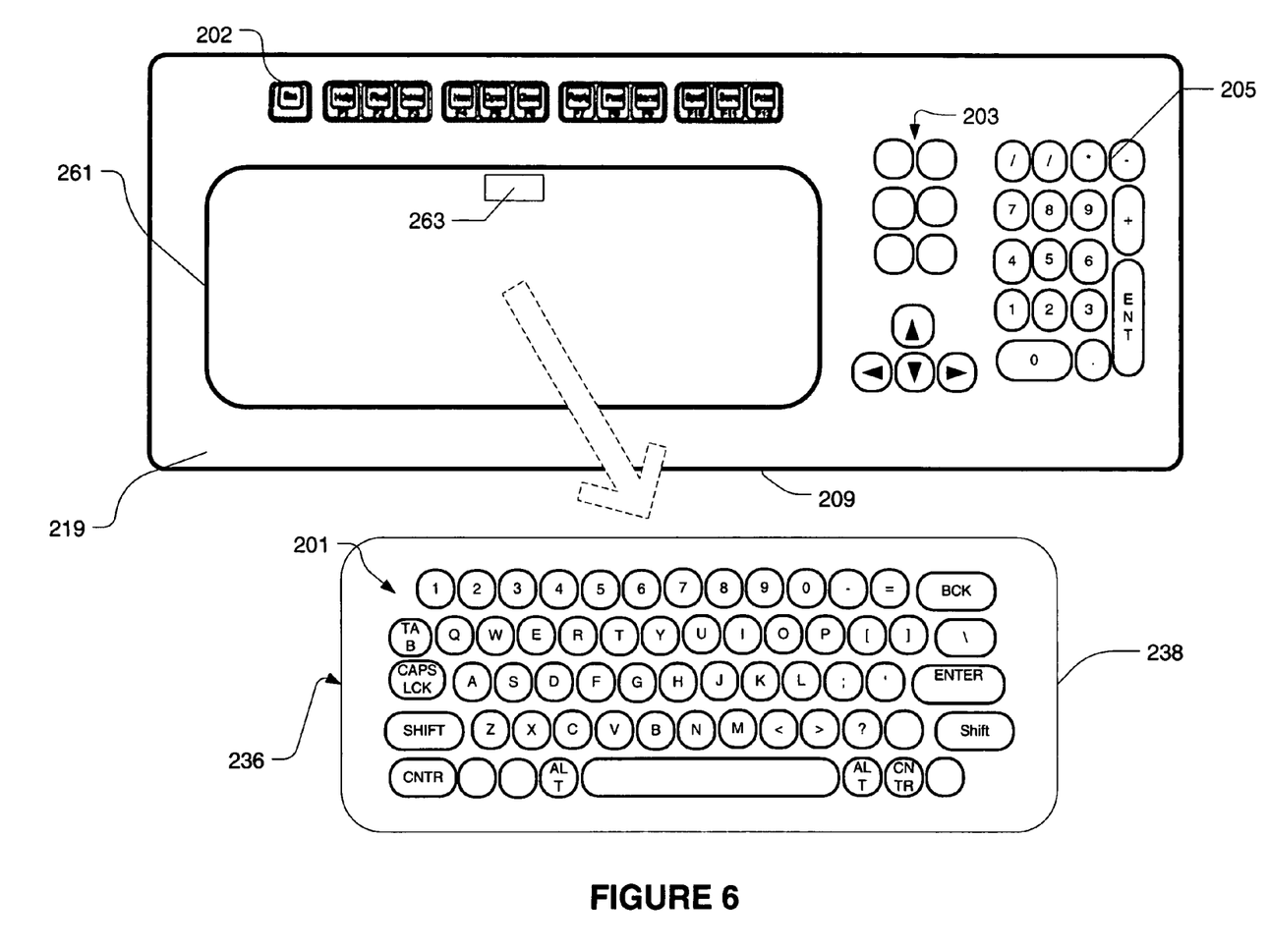
FIG. 6 is a schematic representation of a keyboard arrangement which operates with the removable portion of FIG. 4 according one or more aspects of the present invention.
Figure 7:
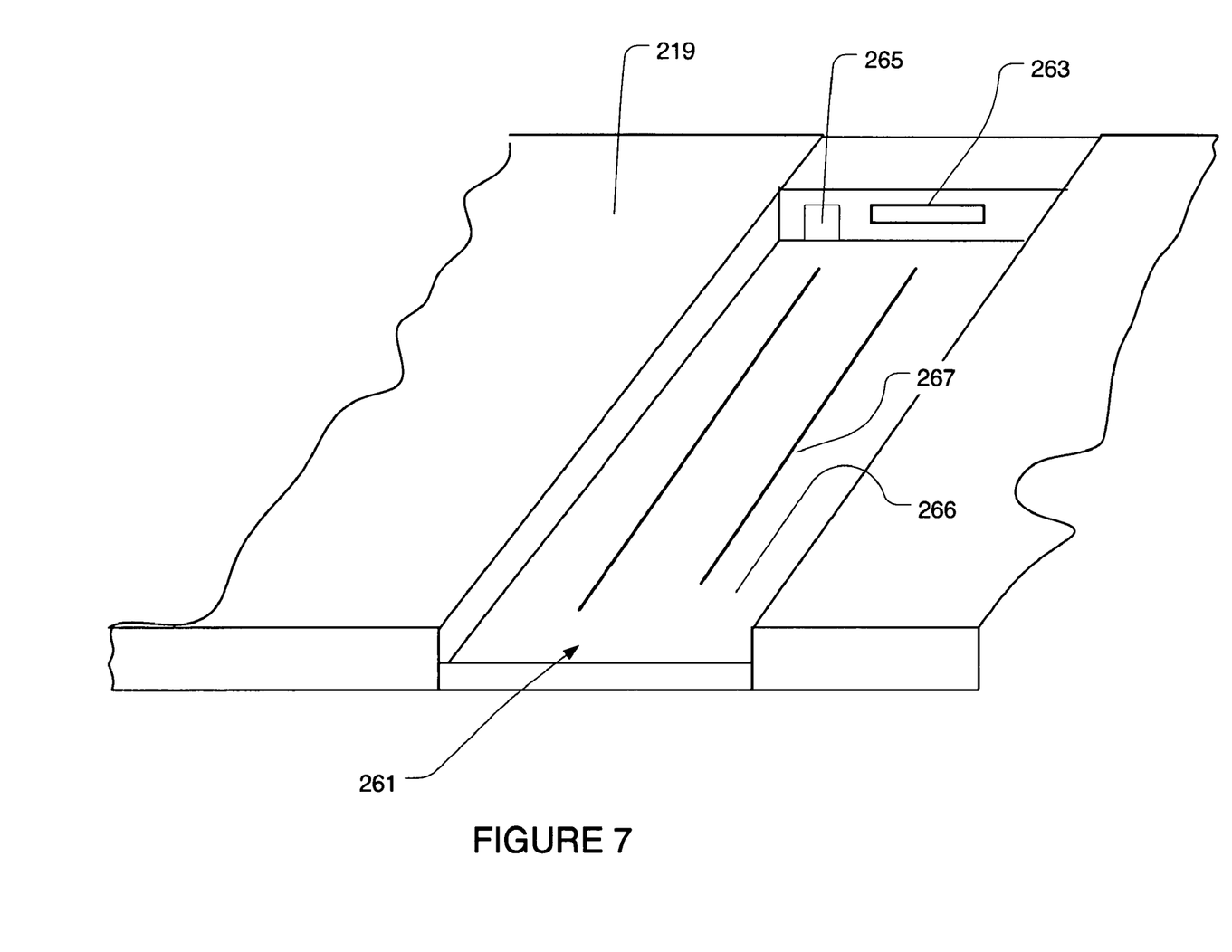
FIG. 7 is a schematic representation of a keyboard arrangement according to one or more aspects of the present invention.
Figure 8:
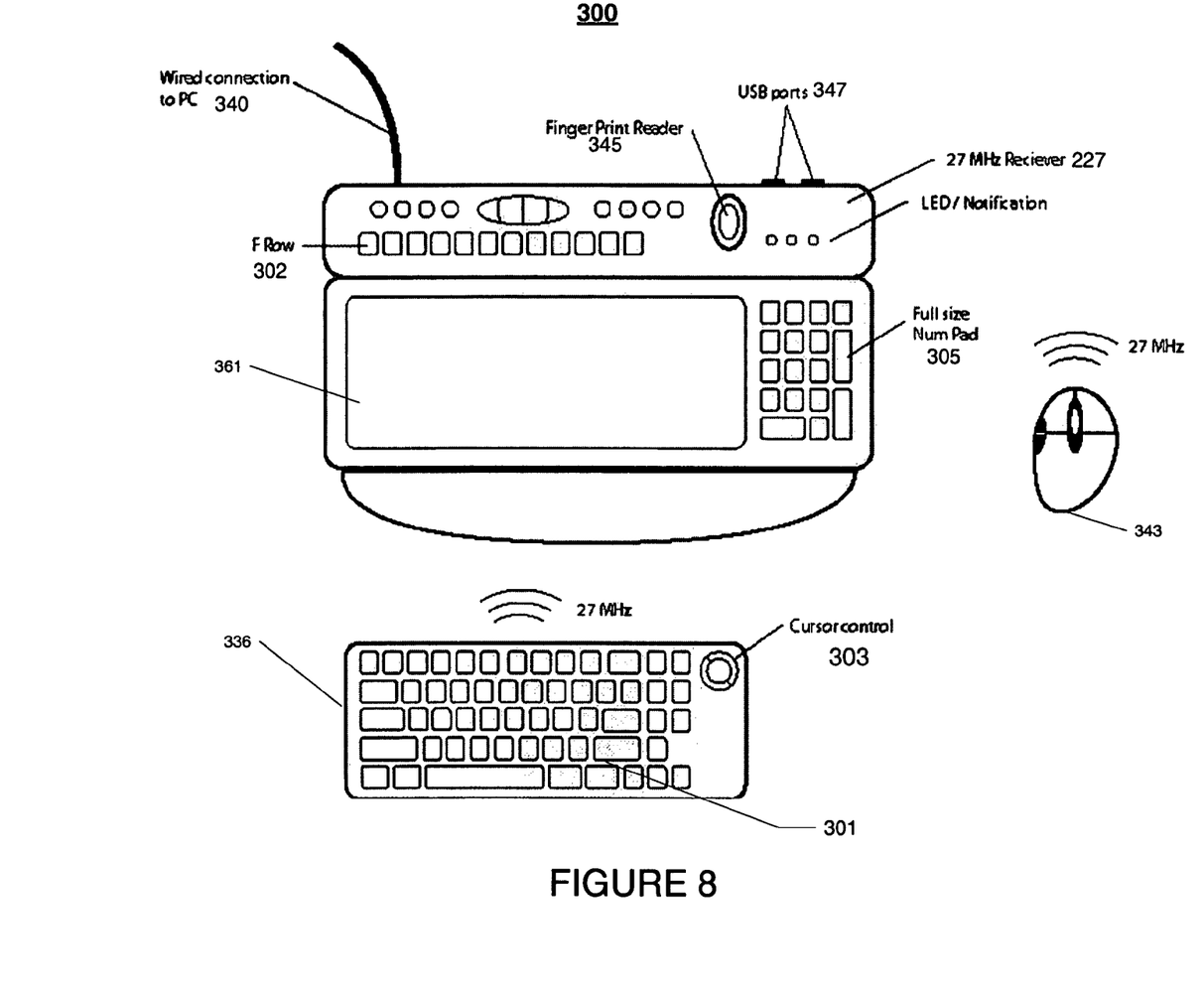
FIG. 8 is a schematic representation of an alternative keyboard arrangement according to one or more aspects of the present invention.

Referring to FIGS. 2-8, in one arrangement keyboard system 200 includes a keyboard base 204 and a removable portion, such as an alphanumeric section 201. Nevertheless, other sections of keyboard system 200 may be removable. For example, the alphanumeric section 201 and the editing section 203 for cursor control may be considered one removable portion as shown in FIG. 8. Turning to FIG. 3, keyboard system 200 may transmit data to the host computer 100 via a wireless connection. The wireless connection arrangement provides the user with untethered freedom to use the keyboard system 200 in a new media environment. The keyboard system 200 may include electronic components and software such as, a control circuitry 221, a memory 223, a receiver 225, a transmitter 227, an antenna 229, electric power source 231, and key mapping/matrix 223, and a media control input 235 for the removable portion. The electric power source 231 provides the electric power to operate the keyboard system 200 components and other functions. In one arrangement, electric power source 231 may be embodied as a battery electrically connected to the various components of the keyboard system 200. If desired, electric power source may implement one or more features of smart battery technology for communicating battery power capacity to host computer. The keyboard housing 219 encloses the aforementioned internal components of the keyboard system 200, such as the control circuitry 221, the memory 223, the receiver 225, and the transmitter 227.

Keyboard base 204 may include hardware and software configured to recognize which key is activated in the key mapping/matrix 223 and process electrical input from the media control input 235. The control circuitry 221 includes one or more microprocessors (not shown) as known in the art for operating on electrical input. Control circuitry 221 is operatively connected to receiver 225, transmitter 227, memory 223, and media control input 235. The memory 223 may be any programmable type in which nonvolatile storage can be electrically erased and reprogrammed. Possible alternatives include flash memory, flash ROM, RAM with battery backup from electric power source 231.

It should be recognized that the terms transmitter, receiver and antenna are used for ease of explanation in that they may embodied in many different alternatives forms. For example, a transmitter and a receiver can be embodied as a transreceiver or a bi-direction communication data port, such as with infrared communications. An antenna can be embodied for receiving or sending radio frequencies. Alternatively, an antenna can be embodied as a lens for infrared communication. Turning to FIG. 3, receiver 225, transmitter 227 and antenna 229 provide a function of allowing the keyboard base 204 to connect wirelessly to the host computer 100 (See FIG. 1) at a proximate distance. An operable distance may be approximately three feet to eighteen feet between and keyboard base 204 and host computer 100. The operable distance can vary depending on a number of factors to include signal strength, obstructions in the transmission path, battery power, and the like. The receiver 225 is operatively coupled to the antenna 229 for receiving a wireless communication transmission including keystroke data, such as key scan codes or other data. The transmitter 227 is also operatively coupled to the antenna 229 for sending a wireless communication transmission or message, such key scan codes or other data.

It should be recognized that host computer 100 includes a receiver and a transmitter (or a transceiver) operatively coupled to the processing unit 110 via the system bus or serial connection. The wireless connection may include infrared frequencies or radio-controlled frequencies, such as Bluetooth radio-frequency ("RF") specification and protocols. One type of wireless connection may be the widely available communication standards such as, the Infrared Data Association ("IrDA") specification and protocols, such as IrDA Data or IrDA Control. The IrDA communication protocols provides low-cost, short-range, cross-platform, point-to-point communications at various transfer rates for devices employing the standardize protocol. There are various suppliers of IrDA compatible hardware for transceivers and interfacing software modules. Nevertheless, the wireless connection may radio frequency based. The radio-controlled configuration may include a transmitter 227 and receiver 225 operating at 27 MHz, but other alternative frequencies may be implemented. Further, it is contemplated that keyboard system 200 may have Wi-Fi capability such that it can be communicate via a wireless network using 802.11b protocol to host computer 100. Nevertheless, any appropriate wireless transmission protocol or wireless medium arrangement can be employed to connect keyboard system 200 to host computer 100 for operation.

FIG. 8 illustrates another arrangement of a keyboard system 300 according to one or more aspects of the present invention. Keyboard system 300 includes an alphanumeric section 301, an editing section 303, and a numeric section 305 similar to the features of keyboard system 200. It should be recognized that keyboard system 300 includes the same structure and functions of keyboard system 200, except where noted herein. Keyboard system 300 includes a keyboard base 304 and a removable section 336 including an alphanumeric section 301 with an editing section 303. Keyboard base 304 is electrically connected to host computer 100 via a keyboard cord 340, instead of a wireless connection.

In one arrangement shown in FIG. 8, keyboard base 304 may be wirelessly connected to a wireless mouse 343. In such an arrangement, the mouse 345 may be use known previously described wireless protocols, such as Bluetooth™ protocol. Mouse 343 may be operable when the removable section 336 is physically connected to the keyboard base 304 or when the section 336 is in wireless communication with the keyboard base 304. Mouse 343 may be responsive to click events and scrolling features as known in the art. In one arrangement, keyboard base 304 may include a biometric device 345, such as a fingerprinter reader. This configuration is useful for data and security features. In one functional arrangement, removable section 336 is prevented from being released from the keyboard base 304, until fingerprint identification is received for a predetermined user or users. It should be recognized that the biometric device 345 may be located on the removable section 304 and may functionally cooperate with control circuitry 221 of keyboard base 204. In a further arrangement, the keyboard base 304 may include several data ports 347 for communication with external devices, such as digital cameras and storage devices.

Figure 9:
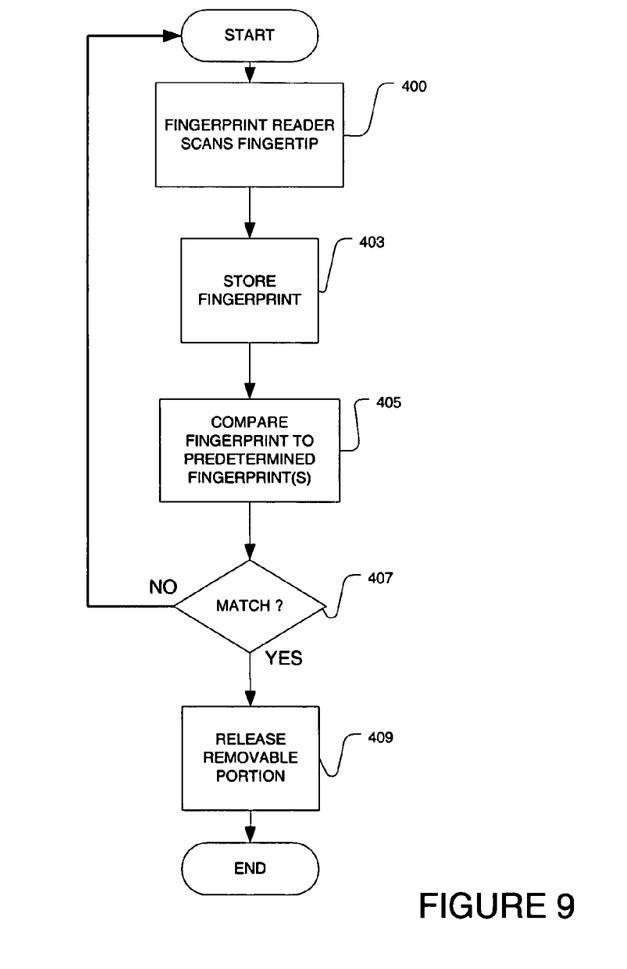
FIG. 9 is a flow diagram of the biometric secure process with keyboard arrangements according to one or more aspects of the present invention.

FIG. 9 illustrates a flow process of operation involving a biometric security feature with a fingerprint. In step 400, biometric device 345, such as a fingerprint reader, scans a finger tip of a user's hand so as to store a digital fingerprint. For example, a thumbprint may be scanned by a fingerprint reader. In step 403, the digital fingerprint is stored in memory. In step 405, a processor with the keyboard base 204 and 304 or host computer 100 is configured to compare the received digital fingerprint with a predetermined fingerprint stored in a computer readable memory for a particular user or users. The computer readable memory may reside in the host computer 100 or may be memory 224 in keyboard base 204, 304. In step 407, if there is a fingerprint match between the received fingerprint and the predetermined fingerprint, then a signal is sent to release, decouple, or otherwise release the removable portion 236, 336 from the keyboard base 204, 304. In step 409, the removal portion 236, 336 is then released from the base unit. In step 409, if there is no match, then the removable portion 236, 336 are prevented from releasing and flow starts again at the fingerprint scanner to step 400. Further, the there may be a light illuminated or other indication that the user was not authorized to obtain the removable portion. It should be recognized that in step 407, a signal may also be sent to enable the key functions of the removable portion 236, 336 to allow a user to operate the alphanumeric section or other keys. In this situation, in step 409, the enabling signal may then allow the key functions to operate. This feature would be advantageous to unlock the keyboard functions for an authorized user of the keyboard system. Nevertheless, the biometric feature can be used with the operating system or application software for execution with host computer 100. It should be recognize that other biometric characteristics may be used and stored for the system. Such examples, may be a voice imprint or portions of a user's hand.

Figure 4:
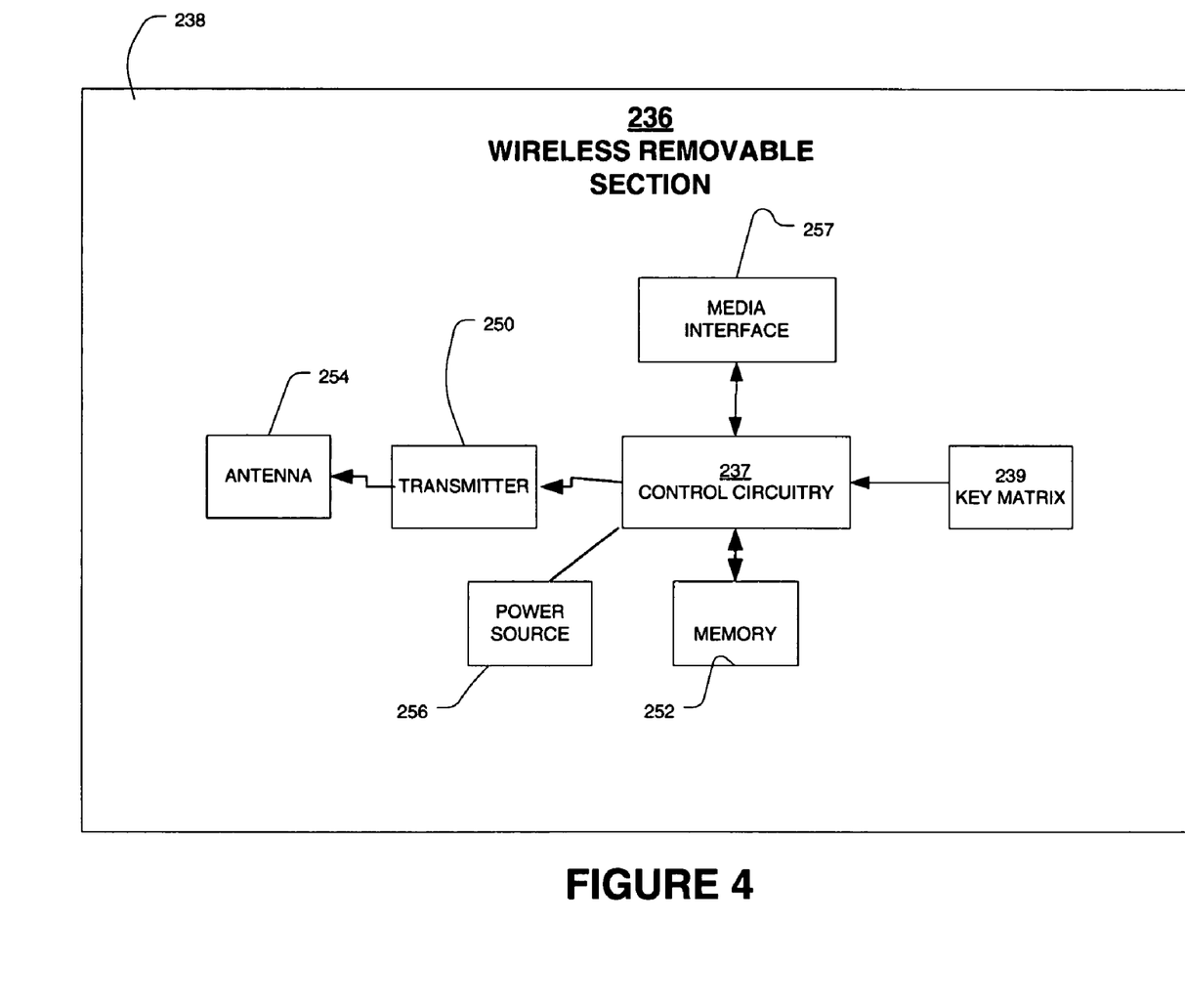
FIG. 4 is a functional block diagram of a removable keyboard portion according to one or more aspects of the present invention.

FIG. 4 is a functional block diagram of a removable section environment according to one or more aspects of the present invention. A wireless alphanumeric section 236 may have a body or housing 238 that may be configured to fit within a user's hand or hands. Body 238 may be formed with conventional manufacturing methods and can be formed of a desired shape with suitable plastic material. In one arrangement, wireless alphanumeric section 236 may be provided and adapted to interface electrically with a keyboard base 204. In another arrangement, wireless alphanumeric section 236 may be configured to draw electrical power from keyboard 204 when physically coupled or nested therein. In yet another arrangement, wireless alphanumeric section 236 including body 238 is adapted to be physically coupled and uncoupled or nestable to provide removability with a keyboard base 204. These features are discussed in detail herein. It should be recognized that keyboard housing 219 may be formed of various shapes and of suitable plastic materials. The housing 219 can be molded or otherwise formed with conventional manufacturing methods.

With continued reference to FIG. 4, it should be recognized that a plurality of keys or buttons are provided to operate the functions of the wireless alphanumeric section 236. Section 236 includes a control circuitry 237 that is configured with hardware and software which provides for the section 236 to recognize which button/key is activated via key matrix 239. Control circuitry 237 includes a microprocessor as known in the art for operating on electrical input such as digital data. Control circuitry 237 is operatively connected to a radio frequency transmitter 250 and computer readable memory 252.

The memory 252 may be a programmable type in which nonvolatile storage can be electrically erased and reprogrammed. Further, wireless alphanumeric section 236 includes a mobile power source 256 for providing electrical power via one or more batteries and the like. Transmitter 250 is also operatively coupled to control circuitry 237 for transmitting signals via an antenna 254. The signals are received by the host computer 100, or keyboard base 204 via receiver/antenna 227 and 229, or other electronic equipment, which is enabled to receive and process wireless signals. For example, the wireless signals may be received and processed by an appropriately configured wireless hub.

Figure 5:
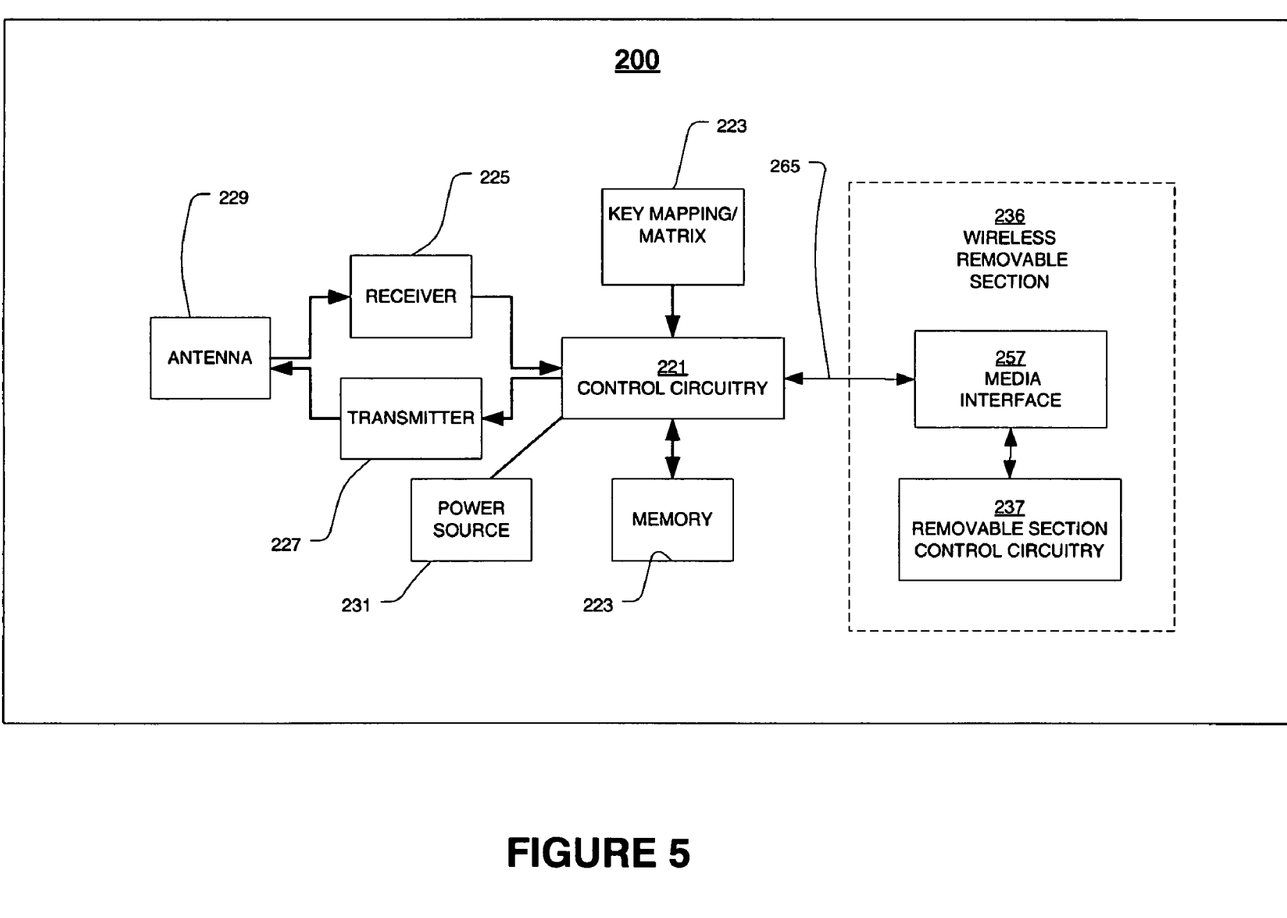
FIG. 5 is a functional block diagram of the keyboard arrangement and removable portion shown in FIG. 4 according to one or more aspects of the present invention.

With reference to FIG. 5, in one arrangement of keyboard system 200, wireless alphanumeric section 236 may be removably coupled via a signal interface connection 265 to provide electrical coupling and physical connections to keyboard base 204. In one such interface arrangement, keyboard base 204 may be electrically coupled to wireless alphanumeric section 236 by way of a bus type arrangement for bi-directional signaling and communications. In a bus type arrangement, data generated at the alphanumeric section 236 is transferred and processed by the keyboard base control circuitry 221. This arrangement allows for faster processing of generated signals from alphanumeric section 236. Alternatively, in another signal interface arrangement, keyboard base 204 may be electrically coupled to alphanumeric section 236 by way of a serial type connection. In these arrangements to provide mateable electrical connections, conventional male and female electrical connectors can be used for physical metal-to-metal contact to transmit electrical data signals. Functionally, when physical mating occurs, a connector of alphanumeric section 236 is sensed by logic in keyboard circuitry 221. Advantageously, data generated by the keys of alphanumeric section 236 is processed by on-board control circuitry 237 and transferred to the keyboard base circuitry 221. Thus, when the alphanumeric section 236 is electrically coupled to keyboard base circuitry 221, data generated by way of a key indication of section 236 is transmitted by the keyboard base 204 to host computer 100 via the antenna 227 and transmitter 229, rather than transmitter 250 and antenna 254 of alphanumeric section 236. Likewise, in a wired configuration to host computer 100 of keyboard base 304(see FIG. 8), data generated by way of a key indication of section 336 is transferred by the keyboard base 304 to host computer 100 via a keyboard cord 350 and the like. It should be recognized that any conventionally appropriate electrical connectors for electrical signaling configuration may be used for the previously discussed connections.

In one coupling arrangement, referring to FIGS. 4 and 5, wireless removable alphanumeric section 236 may include a media interface 257 (shown in dotted lines in FIG. 4) which is configured cooperate with signal interface connection 265 of control circuitry 221 of keyboard base 204. For ease of explanation, FIG. 5 shows in dotted lines, wireless removable alphanumeric section 236 with control circuitry 237 and the media interface 257. Media interface 257 in conjunction with keyboard control circuitry 221 may be embodied in the numbers of formats to provide electrical and logical coupling. In one example, media interface 257 may be a component of a Universal Serial Bus (USB) connection. The USB standard has wide spread use for connecting peripherals to computers. In this example, the control circuitry 221 may include the software to operate with the USB standard. In one embodiment, this Universal Serial Bus can be the Universal Serial Bus-On-the-GO (USB-OTG) standard configured for portable device-to-device communications without a general purpose computer. This implementation is useful in that USB-OTG has low power consumption of about 8 milliamps to preserve the battery operating life. In an USB-OTG implementation, using a topology of host/peripheral, the control circuitry 221 of keyboard base 204 acts as a host device and wireless removable alphanumeric section 236 becomes a peripheral device to the keyboard base 204. Further, data transfer with the USB-OTG allows symmetric bi-directional communications between connected devices. In accordance with an embodiment, wireless removable alphanumeric section 236, 336 can send key input data to keyboard base 204, 304. If desired, keyboard base 204, 304 may send control data to wireless removable alphanumeric section 236, 336 for data control purposes. These configurations of the wireless alphanumeric section 236, 336 are may be provided by way of media interface 257. Nevertheless, other implementations for the media control interface are possible.

With reference to FIGS. 4 and 5, in one operation, when the wireless removable alphanumeric section 236 is physically connected to the control circuitry 221 (see FIG. 5), on-board control circuitry 237 may be configured to disable transmission of data signal, such as key codes or scan code signals, to the transmitter 250 and route those data signals to media interface 257. Thus, data signals generated by a key, cursor device, or scrolling device, may be processed by the control circuitry 237 and transferred to media interface 257. With reference to FIG. 5, media interface 257 passes this electrical information, such as scan codes, digital data and the like; to control circuitry 221 of keyboard base 204. The electrical information is then forwarded to the transmitter 227 and antenna 229 and then transmitted to the host computer 100 or other electrical device. Alternatively, in a wired configuration of keyboard base 304 (see FIG. 8), electrical information from control circuitry 221 is sent via a keyboard signaling cord 340 to host computer 100 rather than transmitter 227 and antenna 229. Thus, keyboard base 204, 304 can retain the removable section 236, 336 for storage, allows for the user to manipulate the section 236, 336 in a desk type configuration when a complete set of keys may be needed. Keyboard designs in accordance aspects of the present invention allows user interaction for manipulating the GUI for the new media technologies and productivity activities, such as creation and modification of electronic documents, spreadsheets, database fields, drawings, photos and the like.

In an aspect of physical removable coupling, with reference to FIGS. 6-8, keyboard base 204, 304 may include a receiving portion 261, 361 which is the part of the keyboard housing 219, 319. Receiving portion 261, 361 is designed to receive and retain wireless removable section 236, 336 therein, respectively. Receiving portion 261, 361 can enable connection to the keyboard control circuitry 221 shown in FIG. 5 via connector 263. (See FIG. 6). The wireless removable section 236, 336 may be mateably disposed to the keyboard housing 219, 319 and to the keyboard processor in control circuitry 221. In one configuration, the media control interface 257 may be formed as an electrical connector designed to mate with signal interface connection 265 formed as complementary connector 263 of the keyboard base 204. It should be recognized that connector 263 includes electrical connections to the control circuitry 221 as shown in FIG. 5. Connection 265 may be within the receiving portion 261 or at a proximate distance from the receiving portion 261. In one example, the connector arrangement may be a USB or mini-USB connecting standard. With the USB-OTG standard, the connectors can be provided for the smaller form factor for portable devices. The connector 263 may have a communication cable with the connector 263 at a device end (section 236) and the other end attached to the keyboard base 204. Alternatively, the connector 263 may be stationary or mounted to the keyboard base 204. Nevertheless, the media interface 257 and signal interface connection 265 may be of other shapes or designs for the intended use for physical removable coupling and electrically connecting the alphanumeric section 236, 336 and keyboard base 204, 304.

In one arrangement, shown in FIGS. 6 and 8, keyboard base 204, 304 with keyboard housing 219, 319 includes receiving portions 261, 361 formed as cavities or recesses. In this arrangement, the user may disengage removable section 236, 336 from the recesses or cavities of receiving portion 261, 361. In another arrangement, removable section 236, 336 may be slidably attached or otherwise coupled to the keyboard base 204, 304. In one arrangement shown in FIG. 7, receiving portion 261 may include a support surface 266, and one or more grooves 267 for slidably guiding the removable section 236 or 336(not shown) to mate with a connector 263. In these configurations, body 238, 338 is in an abutment relationship with keyboard housing 219, 319. Body 238, 338 may be attached or otherwise removably coupled to keyboard housing 219, 319 by way of a snap-fit arrangement. In another arrangement, body 238, 338 may be removable coupled to keyboard base 204, 304 by way of a spring-latch arrangement 270. In such an arrangement, a biasing element, such as a spring, may be configured to force a portion of the removable section 236 out of the receiving portion 261. In one operation with a spring-latch arrangement 265, when removable section 236 is placed in receiving portion 261, a biasing element becomes compressed. The removable section 236 may have a ledged or other portion that is latchable so that the section 236 fits and stays within the receiving portion 261 until released. Thus, when a releasing signal is received by control circuitry 221, a latch may release the section 236 so that the biasing member moves the section 236 forward in the case of a slidable configuration as shown in FIG. 7. Likewise, the removable section 236 may be released upward and out of the receiving portion 261. The releasing signal may originate from a source, such as host computer 100 or biometric device 345 (See FIG. 8). Nevertheless, the releasing signal may emanate from a voice print recognizer which may serve as biometric device 345, for example. Accordingly, body 238, 338 can be removably coupled with keyboard housing 219, 319 in a number of ways.

In another coupling arrangement, wireless alphanumeric section 236 electrical power may be drawn from the keyboard power source 231, instead of power source 256. This power management configuration is particularly useful when keyboard base 304 is in a wired arrangement with host computer 100. Functionally, when physical mating occurs, a connector of wireless alphanumeric section 236 is sensed by keyboard circuitry 221. Electrical power from the power source 256 is temporarily disconnected via a switching arrangement. Advantageously, battery power of the alphanumeric section 236 is conserved and battery of power source 256 may be recharged. This feature can be implemented in a number of ways. For example, in an USB-OTG configuration, battery power may be drawn from the host device instead of the peripheral device. That is, keyboard base 204, 304 serves as a host device and the section 236, 336 serves as a peripheral device. It should be recognized that section 236, 336 may be powered by physical mating with a charging pins. In one arrangement, when the power source 256 is receiving power 302, the control circuitry 237 may report to the host device 100, that it is receiving external power. In such arrangement, a visual indication of the charging arrangement may be provided in the form of a graphical icon configured to operate with an appropriate event-driven operating system. Thus, a graphical user interface can have a display portion relevant to the type of power being received. In the context of the present invention, a displayed "object" may include text, graphics, and other related elements for a display, such as monitor 107 (See FIG. 1) Alternatively, a battery of power source 256 may be inductively charged while mounted in receiving portion 261, 361. Inductive charging can accomplish by well known methods.

Alternate combinations of various aspects of the keyboard arrangements; either alone or in combination with one or more elements have synthetic effects to improve user interaction with a graphic user interface and/or efficiency of operation. For example, in one arrangement, a wired keyboard base unit 304 has a set of multiple key configurations, such as a set of function keys 302, a number pad 305 and/or a fingerprint reader 345. The base unit 304 may be coupled to a host computer 400 via wired signaling arrangement. The base unit may have a wireless receiver that removably couples via wireless signaling to a removable alphanumeric section when the removable section is away from the base unit. The removable section may include a wireless transmitter. When the removable alphanumeric section is physically nested with the base unit, there is wired signaling and battery recharging power management.

Another example includes a wired keyboard base unit 304 with a set of multiple key configurations, such as a set of function keys 302, a number pad 305 and/or a fingerprint reader 345. The base unit 304 is coupled to a host computer via wired signaling. The base unit may have a wireless receiver for a removable alphanumeric section. There may be coupling via wireless signaling if the removable section is nested with the base unit, or if the removable section is physically removed from the base unit. When in a nested arrangement, the removable section can be powered by the base unit for battery recharging power management.

Another example includes a wireless keyboard base unit 204 with multiple key configurations. The base unit 204 may have a wireless transmitter to communicate with host computer 100. A wireless removable alphanumeric section 236 may be nestable within the base unit. The removable section may have a wireless transmitter to the host computer 100 and may be rechargeable when nested in the base unit.

Yet another example includes a wireless keyboard base unit 204 with multiple key configurations. The base unit 204 may have a wireless transmitter to communicate with host computer 100. A wireless removable alphanumeric 236 section may be nestable within the base unit 204. The removable section 236 may have a wireless transmission to the host computer 100, when removed from the base unit. When in a removable arrangement, the section 236 may disable the base unit keys and devices. When the removable section 236 is physically nested within the base unit 204, the signaling may be coupled via physical connection to enable the base unit. The removable section 236 can be recharged when nested in the base unit 204.

If desired, the keyboard systems 200, 300 may have other group of keys or buttons for various functions. For example, there may be a pair of keys for Application Switching; a pair of keys for Copy and Paste; a pair of keys for Forward and Back; a pair of keys for Redo and Undo; a Key for Zooming. In a further arrangement, keyboard system 200, 300 can have an audio control section having a set of audio control keys, such as Command/Dictate On/Off, Microphone On/Off, Speech Correction On/Off, and the like. In another arrangement, the keyboards may have a telephony section having a set of keys, such as take call, transfer call, speaker phone, hold, conference call and the like. These sets of keys can be provided on the removable sections 236, 336 or other removable portions of keyboard systems 200, 300.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer keyboard system comprising:
a base having a number pad and a biometric reader for verifying a biometric characteristic of a user; and
a removable section having an alphanumeric key cluster and a wireless transmitter; the removable section being removably coupleable in a snap-fit fashion to an electro-mechanical connector located on the base wherein the removable section transmits a signal to a host computer via the base, wherein the removable section includes a scrolling device and is configurable in an abutment relationship with the base for a user selectable separation process corresponding to the biometric characteristic of the user;
wherein the biometric reader is configured to send a first signal, upon verifying the biometric characteristic of the user at a first instance of time, so as to physically detach the removable section from the electro-mechanical connector, and a second signal, upon verifying the biometric characteristic of the user at a second instance of time, so as to activate the alphanumeric keys of the removable section for operation, wherein the second signal wirelessly activates the already detached removable section, and wherein the removable section does not include the biometric reader, and
wherein upon complete physical detachment of the removable section, the host computer and the physically detached removable section remain operably connected to each other via the base which includes a wireless receiver to receive the signal from the wireless transmitter of the removable section; and
wherein the selectable separation process is facilitated by transverse grooves or channels located on the base in substantially perpendicular to the electro-mechanical connector for slidably guiding the removable section away from the electro-mechanical connector.

2. The computer keyboard system in accordance with claim 1, wherein the removable section includes a cursor control device.

3. The computer keyboard system in accordance with claim 1, further including a wireless mouse configured to wirelessly communicate with the wireless receiver of the base.

4. The computer keyboard system in accordance with claim 1, wherein the biometric reader comprises a fingerprint reader configured to send the first signal so as to release the removable section from the base responsive to a fingerprint identification of the user.

5. The computer keyboard system in accordance with claim 1, in which the base includes a receiving portion adapted to substantially enclose the removable section therein.

6. The computer keyboard system in accordance with claim 1, wherein the removable section removable coupling comprises a media interface.

7. A computer keyboard system comprising:
- a first keyboard housing including a processor therein for operating a number pad with a key cluster or a biometric reader for verifying a biometric characteristic of a user; and
- a second keyboard housing having an alphanumeric section; wherein said second keyboard housing is nestable within a receiving portion of the first keyboard housing and removably coupleable to an electro-mechanical connector located on the first keyboard housing such that when said first keyboard housing and second keyboard housing are coupled together, said first keyboard housing includes a processor operable to electrically charge to a mobile power source in the second keyboard housing, wherein the second keyboard housing includes a scrolling device and is configurable in an abutment relationship with the first keyboard housing for a user selectable separation process corresponding to the biometric characteristic of the user to trigger a stand-alone self-powered mode to trigger an input to a processor link for user-based input with the second key-board housing,
- wherein the biometric reader is configured to send a first electrical signal, upon verifying the biometric characteristic of the user at a first instance of time, to facilitate physical detachment of the second keyboard housing from the electro-mechanical connector, and a second electrical signal, upon verifying the biometric characteristic of the user at a second instance of time, to activate the alphanumeric section of the second keyboard housing for operation, wherein the second signal wirelessly activates the alphanumeric section of the already detached second keyboard housing, and wherein the second keyboard housing does not include the biometric reader, and
- wherein upon complete physical detachment of the second keyboard housing, the first keyboard housing and the physically detached second keyboard housing remain operably connected to each other via a wireless receiver located on the first keyboard housing to receive a signal from a wireless transmitter located on the second keyboard housing; and
- wherein the selectable separation process is facilitated by transverse grooves or channels located on the first keyboard housing in substantially perpendicular to the electro-mechanical connector for slidably guiding the second keyboard housing away from the electro-mechanical connector.

8. The computer keyboard system in accordance with claim 7, wherein the second keyboard housing includes a cursor control device.

9. The computer keyboard system in accordance with claim 7, wherein the biometric device comprises a fingerprint reader system configured to send the first electrical signal to release the second keyboard housing from the first keyboard based on fingerprint identification of the user.

10. The computer keyboard system in accordance with claim 7, wherein the second keyboard housing removable coupling comprises media interface configured to cooperate with the processor.

11. The computer keyboard system in accordance with claim 7, wherein the second keyboard housing is removably coupleable to the connector in a snap-fit fashion.

12. A computer keyboard configured for wireless communication with a computer, comprising:
- a keyboard housing;
- a keyboard processor configured to cooperate with a transmitter for wireless communication to a computer;
- a fingerprint reader mounted to the keyboard housing for verifying a fingerprint identification of a user; and
- a removable alphanumeric section removably coupleable in a snap-fit fashion to a electro-mechanical connector located on the keyboard housing, wherein the removable alphanumeric section having a processor and a transmitter for wireless communication to the computer; the alphanumeric section including a group of alphanumeric keys being operatively connected to the processor, wherein the removable section includes a scrolling device and is configurable in an abutment relationship with the keyboard housing for a user selectable separation process corresponding to the fingerprint identification of the user,
- wherein the fingerprint reader is configured to send a first signal, upon verifying the biometric characteristic of the user at a first instance of time, so as to physically detach the removable alphanumeric section from the connector, and a second signal, upon verifying the biometric characteristic of the user at a second instance of time, so as to activate the alphanumeric keys of the removable alphanumeric section for operation, wherein the second signal wirelessly activates the alphanumeric keys of the already detached removable alphanumeric section, and wherein the removable alphanumeric section does not include the biometric reader, and
- wherein upon complete physical detachment of the removable alphanumeric section, the computer and the physically detached removable alphanumeric section remain operably connected to each other via the keyboard housing which includes a wireless receiver to receive the signal from the wireless transmitter of the removable alphanumeric section, and
- wherein the selectable separation process is facilitated by transverse grooves or channels located in the keyboard housing in substantially perpendicular to the electro-mechanical connector for slidably guiding the second keyboard housing away from the electro-mechanical connector.

13. The computer keyboard in accordance with claim 12, wherein the removable section includes a cursor control device.

14. The computer keyboard in accordance with claim 12, in which the keyboard housing includes a receiving portion adapted to substantially enclose the removable alphanumeric section therein.

15. A computer keyboard configured for communication with a computer, comprising:
- a keyboard housing;
- a keyboard processor within the keyboard housing for communicating with the computer; and
- a removable keyboard portion removably coupleable to a connector located on the keyboard housing, wherein the removable keyboard portion comprising:
- an alphanumeric section including a group of alphanumeric keys being operatively connectable to the keyboard processor;
- a transmitter for wireless communication;

a biometric reader device configured for communicating with the keyboard processor based on a biometric characteristic of a user; and a scrolling device, wherein the removable keyboard portion is configurable in an abutment relationship with the keyboard housing for a user selectable separation process corresponding to the biometric characteristic of the user to trigger a stand-alone self-powered mode to trigger an input to a processor link for user-based input with the removable keyboard portion, and wherein the biometric reader is configured to send a first electrical signal, upon verifying the biometric characteristic of the user at a first instance of time, so as to facilitate physical detachment of the removable keyboard portion from the electro-mechanical connector, and a second electrical signal, upon verifying the biometric characteristic of the user at a second instance of time, to activate the alphanumeric keys of the removable keyboard portion for operation, wherein the second signal wirelessly activates the alphanumeric keys of the already detached removable keyboard portion, and wherein the removable keyboard portion does not include the biometric reader, and wherein upon complete physical detachment of the removable keyboard portion, the computer and the physically detached removable keyboard portion remain operably connected to each other via the keyboard housing which includes a wireless receiver to receive a signal from the wireless transmitter of the removable keyboard portion; and wherein the mechanical detachment is facilitated by transverse grooves or channels located in the keyboard housing in substantially perpendicular to the electro-mechanical connector for slidably guiding the removable keyboard portion away from the electro-mechanical connector.

16. The computer keyboard in accordance with claim 15, wherein the removable keyboard portion includes a cursor control device.

17. The computer keyboard in accordance with claim 15, further including a wireless mouse configured for wireless communication with the computer via the keyboard processor.

18. The computer keyboard in accordance with claim 15, wherein the removable keyboard portion is removably coupleable to the connector in a snap-fit fashion.

* * * * *